US008760688B2

(12) United States Patent  (10) Patent No.: US 8,760,688 B2
Nagao et al.  (45) Date of Patent: Jun. 24, 2014

(54) IMAGE PROCESSING SYSTEM AND APPARATUS FOR STORING JOB INFORMATION USED FOR LATER ACQUIRING CORRESPONDING IMAGE DATA UPON JOB PROCESSING

(75) Inventors: Masafumi Nagao, Kanagawa (JP); Ayako Watanabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 13/064,891

(22) Filed: Apr. 25, 2011

(65) Prior Publication Data
US 2011/0299108 A1   Dec. 8, 2011

(30) Foreign Application Priority Data
Jun. 2, 2010  (JP) ................. 2010-127295

(51) Int. Cl.
G06F 3/12 (2006.01)
G06K 15/00 (2006.01)

(52) U.S. Cl.
USPC .......... 358/1.15; 358/1.13; 358/1.14

(58) Field of Classification Search
None
See application file for complete search history.

(56) References Cited

U.S. PATENT DOCUMENTS 5,886,793 A * 3/1999 Satou ........................ 358/404
6,023,560 A * 2/2000 Yoshida et al. ............ 358/1.16
2002/0060809 A1 * 5/2002 Aoki ......................... 358/1.15
2008/0068650 A1 * 3/2008 Negoro ...................... 358/1.15
2008/0080003 A1 * 4/2008 Ferlitsch et al. ........... 358/1.16
2010/0238476 A1 * 9/2010 Morita ....................... 358/1.13
2011/0235092 A1 * 9/2011 Bosma ...................... 358/1.15

FOREIGN PATENT DOCUMENTS

JP   2002290647 A   10/2002
JP   2003296086 A   10/2003

* cited by examiner

Primary Examiner — Fan Zhang
(74) Attorney, Agent, or Firm — Harness, Dickey & Pierce, P.L.C.

(57) ABSTRACT

An image processing system includes a first image processing apparatus and a second image processing apparatus connected to the first image processing apparatus. The first image processing apparatus includes a reader reading image data, a storage storing job information, a request unit transmitting a job request as a job to the second image processing apparatus to execute the job corresponding to the job information based on a job execution scheduling, and an introducing unit introducing the job information to the second image processing apparatus. The second image processing apparatus includes a receiver receiving the job request from the first image processing apparatus as the job, a job executing unit executing the job corresponding to the job information, a determining unit determining whether to acquire the job information based on the job execution scheduling, and an acquiring unit acquiring the job information based on a determined result from the determining unit.

4 Claims, 17 Drawing Sheets

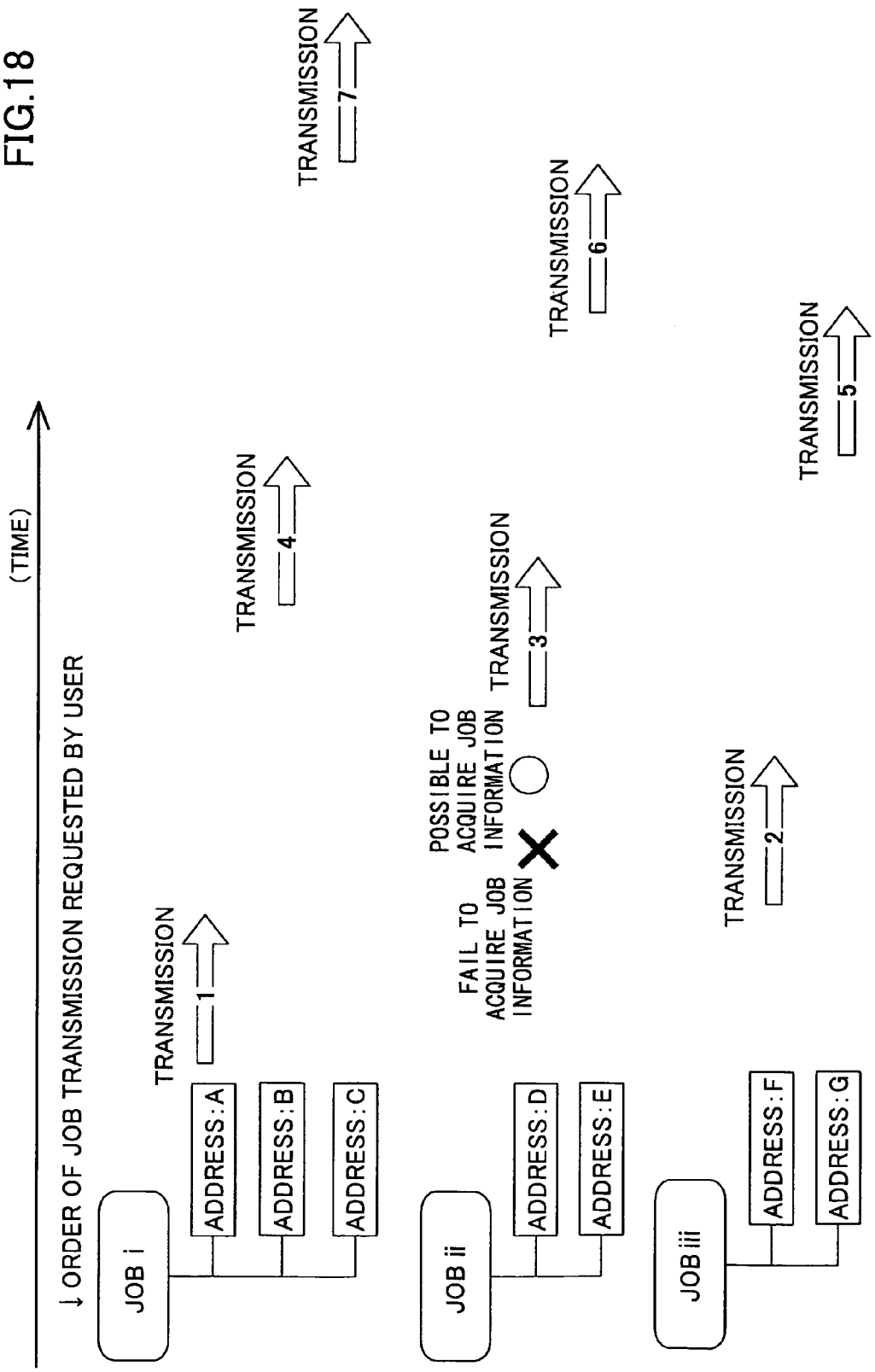

IMAGE PROCESSING SYSTEM AND APPARATUS FOR STORING JOB INFORMATION USED FOR LATER ACQUIRING CORRESPONDING IMAGE DATA UPON JOB PROCESSING

BACKGROUND OF THE INVENTION

1. Field of the Invention

The invention generally relates to an image processing system and an image processing apparatus.

2. Description of the Related Art

There is a technology known in the art in which plural image processing apparatuses are connected such that, when one image processing apparatus receives a FAX transmission job that the image processing apparatus may not be able to carry out by itself, the image processing apparatus may request other image processing apparatuses connected to it to carry out such a FAX transmission job. For example, in such a technology, one image processing apparatus having no FAX function (hereinafter called a "master machine") connects to another image processing apparatus having a FAX function (hereinafter called a "slave machine") such that a document read by the master machine is FAX transmitted by the slave machine connected to the master machine.

However, in this example, an upper limit of one FAX operation conducted by the slave machine is predetermined so that a new job may not be carried out if the operation of the new job exceeds the upper limit of the FAX operation. The upper limit is set for the FAX operation to prevent a storage region for the FAX transmission function from receiving jobs that may exceed its capacity, because the storage region needs to store FAX transmission condition information such as an address or image information every time a new job is assigned. Note that the FAX transmission condition information and the image information contained in a job are hereinafter simply called "job information").

In such collaborative FAX transmission, since each of the master machine and the slave machine includes a storage region, such a master-slave model may carry out the number of FAX transmissions more than the number of FAX transmissions carried out by a stand-alone FAX machine. Japanese Patent Application Publication No. 2002-290647 discloses an example of the master-slave model configuration in which a master digital copier reads a document image, transfers the read document image to a slave digital copier having a FAX function, and requests the slave digital copier to fax the transferred document image.

However, it may not be efficient for FAX transmission scheduling to simply carry out specific jobs in corresponding apparatuses. The FAX transmissions are generally carried out based on the round-robin job scheduling. The round-robin job scheduling differs from sequential job scheduling where jobs are processed in the job-introduced order. Specifically, in the round-robin job scheduling, job requests are transmitted in the address order from respective first addresses in different job queues. That is, after all job requests corresponding to the first addresses in the different job queues are transmitted, and job requests corresponding to the second addresses are transmitted. The job information is distributed between the master machine and the slave machine in the master-slave model. However, in such round-robin job scheduling, when the slave machine needs to transmit a job request (i.e., when a transmission turn of a job request comes) but the appropriate job information corresponding to the job request is not readily available (i.e., not stored) in the slave machine, the slave machine may not be able to transmit the job request to a corresponding address due to lack of the necessary information in the slave machine.

SUMMARY OF THE INVENTION

It is a general object of at least one embodiment of the present invention to provide an image processing system and image processing apparatuses collaborating to form the image processing system that is capable of carrying out fax transmission based on the round-robin job scheduling even if job associated information is stored in the collaborative image processing apparatuses in the image processing system that substantially eliminate one or more problems caused by the limitations and disadvantages of the related art.

In one embodiment, there is provided an image processing system that includes a first image processing apparatus; and a second image processing apparatus connected to the first image processing apparatus. In the image processing system, the first image processing apparatus includes a reader configured to read an image of a document as image data; a storage configured to store job information including the image data and a transmission condition of the image data; a request unit configured to transmit a job request as a job to the second image processing apparatus together with identifier information for specifying the job information and control information for controlling job execution scheduling based on which the job corresponding to the job information is executed such that the request unit requests the second image processing apparatus to execute the job corresponding to the job information based on the job execution scheduling; and an introducing unit configured to introduce the job information to the second image processing apparatus. Further, in the image processing system, the second image processing apparatus includes a receiver configured to receive the job request transmitted from the first image processing apparatus as the job; a job executing unit configured to execute the job corresponding to the job information requested by the first image processing apparatus; a determining unit configured to determine whether to acquire the job information based on the job execution scheduling; and an acquiring unit configured to acquire the job information from the first image processing apparatus based on a determined result supplied by the determining unit.

In another embodiment, there is provided an image processing apparatus connected to a different image processing apparatus. The image processing apparatus includes a reader configured to read an image of a document as image data; a storage configured to store job information including the image data and a transmission condition of the image data; a request unit configured to transmit a job request to the different image processing apparatus together with identifier information for specifying the job information and control information for controlling job execution scheduling based on which a job corresponding to the job information is executed such that the request unit requests the different image processing apparatus to execute the job corresponding to the job information based on the job execution scheduling; and an introducing unit configured to introduce the job information to the different image processing apparatus.

In another embodiment, there is provided an image processing apparatus connected to a different image processing apparatus. The image processing apparatus includes a receiver configured to receive a job executing request as a job, the job executing request containing identifier information for specifying job information including image data read by the different image processing apparatus and a transmission condition of the image data, and control information for controlling job execution scheduling based on which the job corresponding to the job information is executed; a job executing unit configured to execute the job corresponding to the job information requested by the different image processing apparatus; a determining unit configured to determine whether to acquire the job information from the different image processing apparatus based on the job execution scheduling; and an acquiring unit configured to acquire the job information from the different image processing apparatus based on a determined result supplied by the determining unit.

BRIEF DESCRIPTION OF THE DRAWINGS

Other objects and further features of embodiments will be apparent from the following detailed description when read in conjunction with the accompanying drawings, in which:

FIG. 18 is a diagram illustrating an example of a transmitting order in the scheduling when the skipped job is interposed.

DESCRIPTION OF THE PREFERRED EMBODIMENTS

In the following, embodiments will be described with reference to accompanying drawings.

In an image processing system according to the embodiments, a slave machine is configured to store job information necessary for round-robin scheduling that is stored in a master machine. Further, the slave machine is configured to acquire job information from the master machine if there is a job for which the slave machine needs transmitting the job information that has not been stored in the slave machine.

Before the descriptions of the embodiments, a transmitting order determined by the round-robin system or round-robin scheduling is described first.

The round-robin scheduling is a time allocating system, which allocates time slices to processes in a job waiting queue in a rotational order, handling all processes without priority. For example, when processes in the job waiting queue are FAX transmissions, the FAX transmissions are carried out in an address order from the first addresses in the different FAX transmission waiting queues. After having executing all the job requests corresponding to the first addresses, FAX transmissions corresponding to the second addresses are carried out in a like manner.

Figure 1:
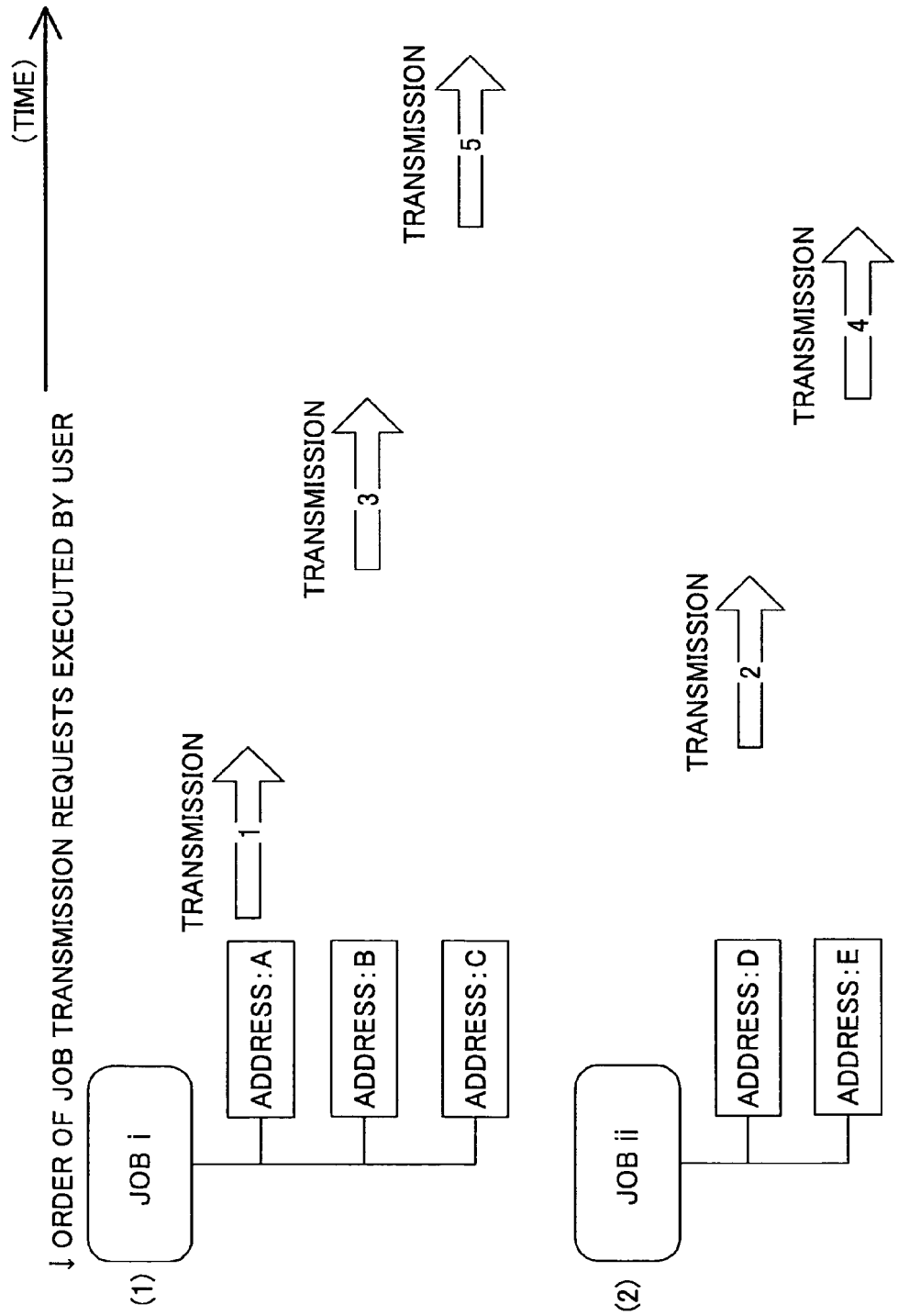
FIG. 1 is a diagram illustrating an example of a transmitting order in round-robin scheduling when there are a job i and a job ii each including plural addresses.

FIG. 1 is a diagram illustrating an example of a transmission order in the round-robin scheduling when there are a job i and a job ii each including plural addresses. The job i and the job ii in FIG. 1 may be, for example, FAX transmission jobs. In the example illustrated in FIG. 1, FAXes are transmitted in the order of an address A in the job i (first address in the job i), an address D in the job ii (first address in the job ii), and an address B in job i (second address in the job i). In the round-robin scheduling, a job is switched to another one every time one job is transmitted to a corresponding address. It is preferable that the jobs such as FAX transmissions are scheduled in round-robin scheduling so as not to engage a telephone line with a single job.

First Embodiment

Figure 2:
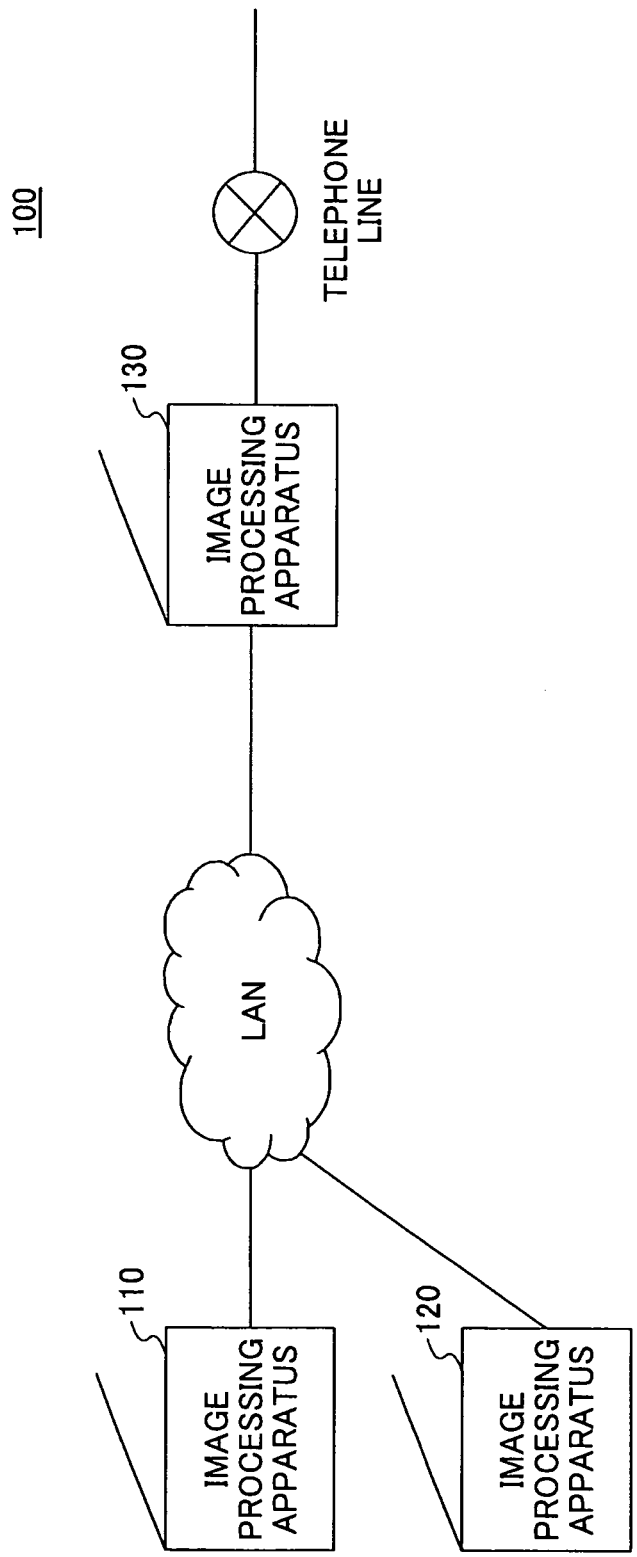
FIG. 2 is a diagram illustrating an example of an image processing system according to a first embodiment.

Next, an image processing system 100 according to a first embodiment is described. FIG. 2 is a diagram illustrating an example of the image processing system according to the first embodiment.

An image processing system 100 according to the first embodiment is configured such that plural image processing apparatuses 110, 120, and 130 are connected via a network. The network utilized in the image processing system 100 according to the first embodiment may be a local area network (LAN). As illustrated in FIG. 2, in the image processing system 100, the image processing apparatuses 110 and 120 have no FAX function and the image processing apparatus 130 connected to a telephone line has a FAX function. The image processing apparatuses 110 and 120 are configured to transmit an image read by themselves to the image processing apparatus 130 via the network so that the image processing apparatuses 110 and 120 may fax the image read by themselves via the collaborative image processing 130. That is, the image processing apparatuses 110 and 120 may carry out FAX transmission in collaboration with the image processing apparatus 130. Such a system may be called an apparatus collaborative system.

Note that in the apparatus collaborative system, plural apparatuses collaboratively connected via the network may implement one function.

Figure 3:
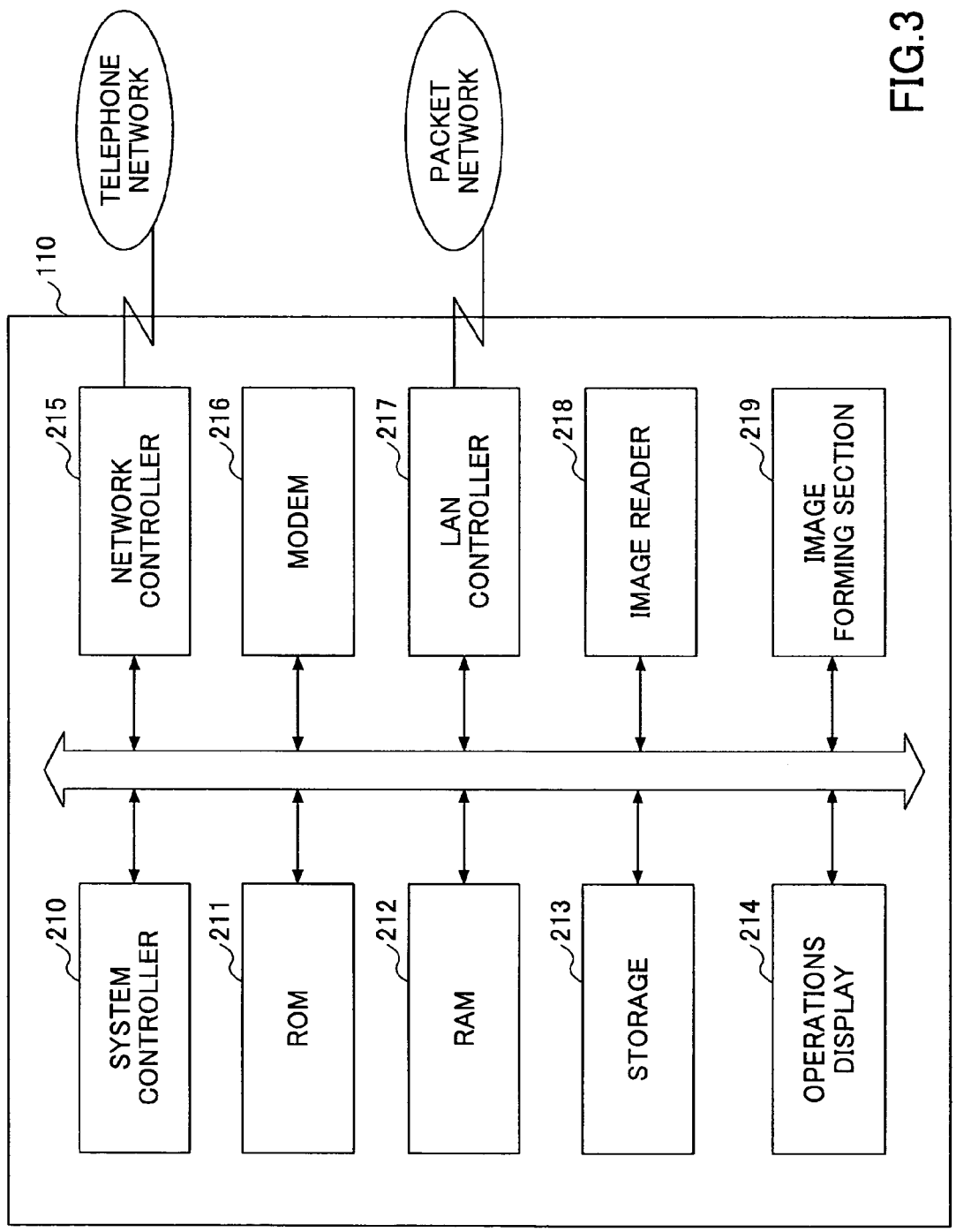
FIG. 3 is a diagram illustrating an example of a hardware configuration of an image processing apparatus of the image processing system according to the first embodiment.

FIG. 3 is a diagram illustrating an example of a hardware configuration of the image processing apparatus 110 that partially forms the image processing system 100 according to the first embodiment. Since the image processing apparatuses 110, 120 and 130 that form the image processing system 100 according to the first system have similar hardware configurations, the hardware configuration of the image processing apparatus 110 is illustrated as an example.

The image processing apparatus 110 mainly includes a system controller 210, a read only memory (ROM) 211, a random access memory (RAM) 212, a storage 213, an operations display 214, a network controller 215, a modem 216, a LAN controller 217, an image reader 218, and an image forming section 219.

The system controller 210 is a microcomputer configured to control components of the image processing apparatus 110 based on a control program written in the ROM 211 while utilizing the RAM 212 as a working region. The ROM 211 is a read only memory in which the control program is stored, based on which the system controller 210 controls the components of the image processing apparatus 110. The RAM 212 is a random access memory utilized by the system controller 210 as a working region.

The storage 213 is formed of a hardware disk or the like that is configured to store data. The operations display 214 is configured to display the operational status of the image processing apparatus and receive various operational inputs. The LAN controller 217 is configured to decode the data received from a packet network or encode the data to be transmitted to the packet network. That is, the LAN controller 217 is configured to buffer transmitting frames or received frames to have one apparatus able to collaborate with other connected apparatuses.

The modem 216 is a G3 or G4 facsimile modem configured to modulate the data to be transmitted to the telephone network via the network controller 215 and also configured to demodulate the data received from the telephone network 215 via the network controller 215. Further, the modem 216 is configured to transmit a dual-tone multi-frequency (DTMF) signal corresponding to a number of a recipient.

The network controller 215 is connected to the telephone network and configured to control a connection with the telephone line, which includes detecting reversal of polarity, detecting closed or opened direct current loop of the telephone line, detecting closed or opened the telephone line, detecting dial tone, detecting a tone signal such as a business tone, and detecting a call signal. Further, the network controller 215 is configured to transmit a dial pulse signal corresponding to a dial line of a 20 PPS or 10 PPS signal corresponding to the number of the recipient.

Next, functional configurations of the image processing apparatuses 110, 120 and 130 are described. In the image processing system 100 according to the first embodiment, the image processing apparatus 110 or 120 having no FAX function reads an image and transmits the read image to the image processing apparatus 130 having the FAX function such that the image processing apparatus 130 that has received the read image carries out FAX transmission. Thus, in the image processing system 100 according to the first embodiment, the image processing apparatus 110 or 120 serves as the master machine and the image processing apparatus 130 serves as the slave machine.

Note that in the first embodiment, the image processing apparatus having no FAX function is called the master machine and the image processing apparatus having the FAX function is called the slave machine.

Figure 4:
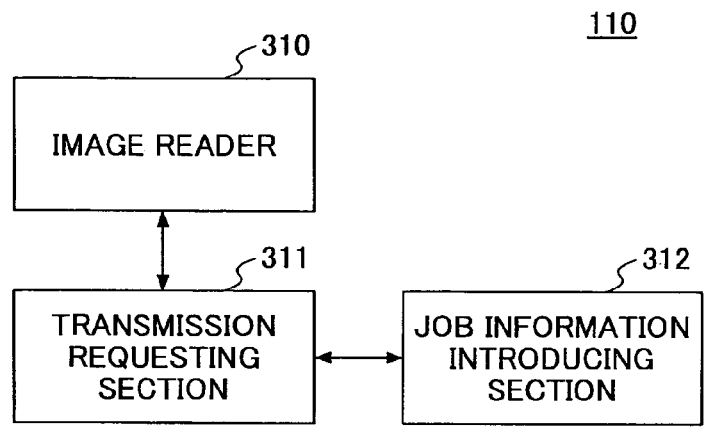
FIG. 4 is a diagram illustrating an example of an image processing apparatus that serves as a master machine in the image processing system according to the first embodiment.

FIG. 4 is a diagram illustrating an example of the image processing apparatus that serves as the master machine in the image processing system 100 according to the first embodiment. In the image processing system 100 according to the first embodiment, the image processing apparatuses 110 and 120 that serve as the master machines have similar functional configurations. Thus, the functional configuration of the image forming apparatus 110 is illustrated as an example.

The image processing apparatus 110 includes an image reader 310, a transmission requesting section 311, and a job information introducing section 312. The image reader 310 reads a document to create image data of the read document. The transmission requesting section 311 sends a later-described transmitting request to the slave machine. The job information introducing section 312 introduces later-described job information to the slave machine according to the response to the transmitting request from the slave machine.

In the image processing system 100 according to the first embodiment, if the master machine is configured to store the job information, the later-described information necessary for a job scheduling is sent to the slave machine as slave machine transmitting information. The transmission request sent by the transmission requesting section 311 is a request for transmitting the slave machine transmitting information.

Figure 5:
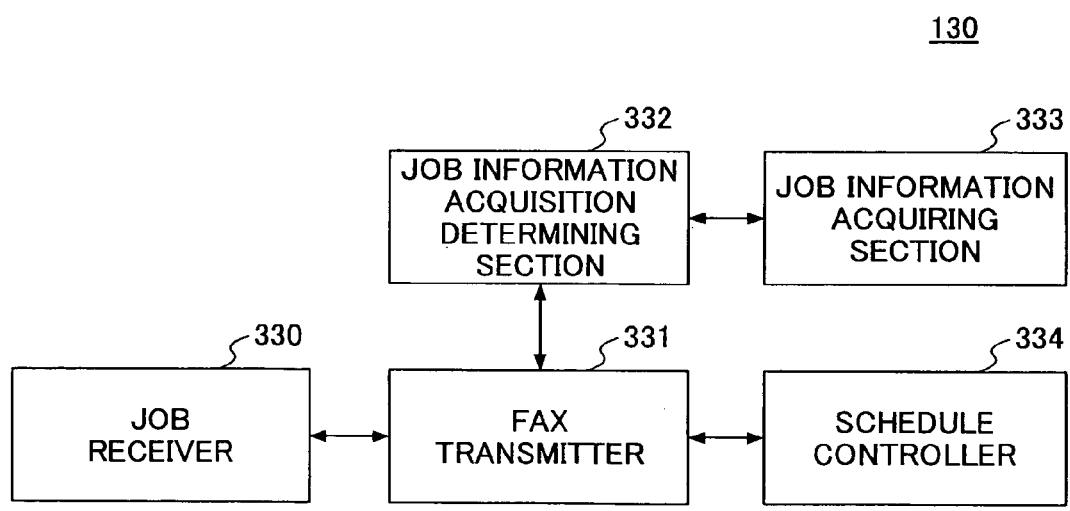
FIG. 5 is a diagram illustrating an example of an image processing apparatus that serves as a slave machine in the image processing system according to the first embodiment.

FIG. 5 is a diagram illustrating an example of the image processing apparatus 130 that serves as the slave machine in the image processing system 100 according to the first embodiment.

In the image processing system 100 according to the first embodiment, the image processing apparatus 130 serves as the slave machine. The image processing apparatus 130 includes a job receiver 330, a FAX transmitter 331, a job information acquisition determining section 332, a job information acquiring section 333 and a scheduling controller 334.

The job receiver 330 is configured to receive as a job a request including slave machine transmitting information transmitted by the master machine. The FAX transmitter 331 is configured to fax image data. The job information acquisition determining section 332 is configured to determine whether to acquire job information corresponding to a job execution time from the master machine. The job information acquiring section 333 is configured to acquire, when appropriate, the job information from the master machine. The scheduling controller 334 is configured to control scheduling of jobs to be faxed.

Figure 6B:
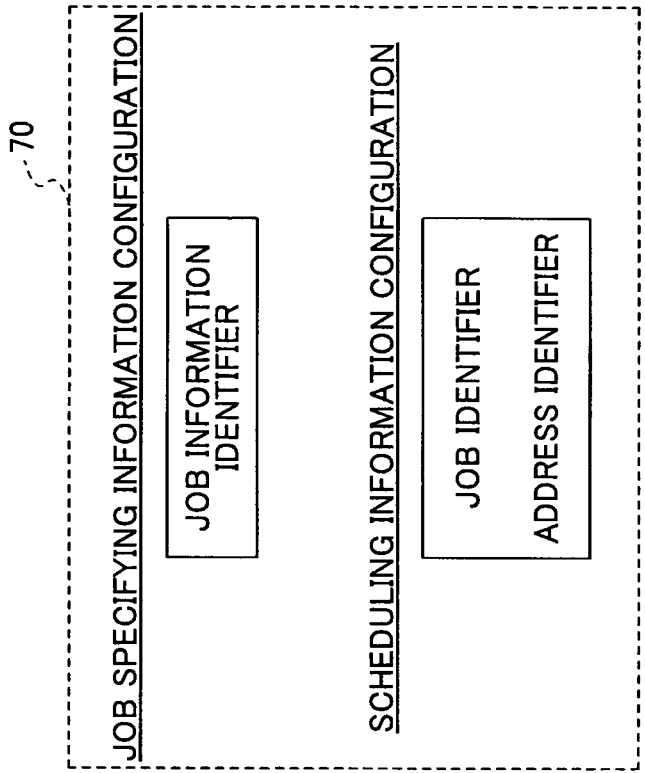
FIGS. 6A and 6B are diagrams illustrating a configuration of job information.
Figure 6A:
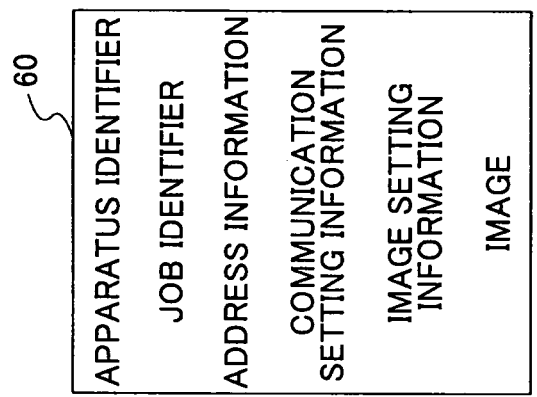

Below, the job information and the information necessary for the job scheduling in the image processing system 100 according to the first embodiment are described. FIGS. 6A and 6B are diagrams illustrating a configuration of the job information. FIG. 6A illustrates job information 60 and FIG. 6B illustrates slave machine transmitting information that is information necessary for the job scheduling.

As illustrated in FIG. 6A, the job information 60 includes an apparatus identifier, a job identifier, address information of transmitting destination, communication setting information and line image setting information. The apparatus identifier indicates the identification of a master machine. The job identifier indicates the identification of a job. The communication setting information includes settings for the communication such as a modem rate or a transmission mode. The line image setting information includes setting information for images such as line density and a compression format.

The slave machine transmitting information 70 includes job information identifier and scheduling information. The job information identifier is information that specifies a job and indicates a location where the job information is stored.

The scheduling information includes the job identifier and the address identifier that indicates an address to which a FAX is transmitted.

Figure 7:
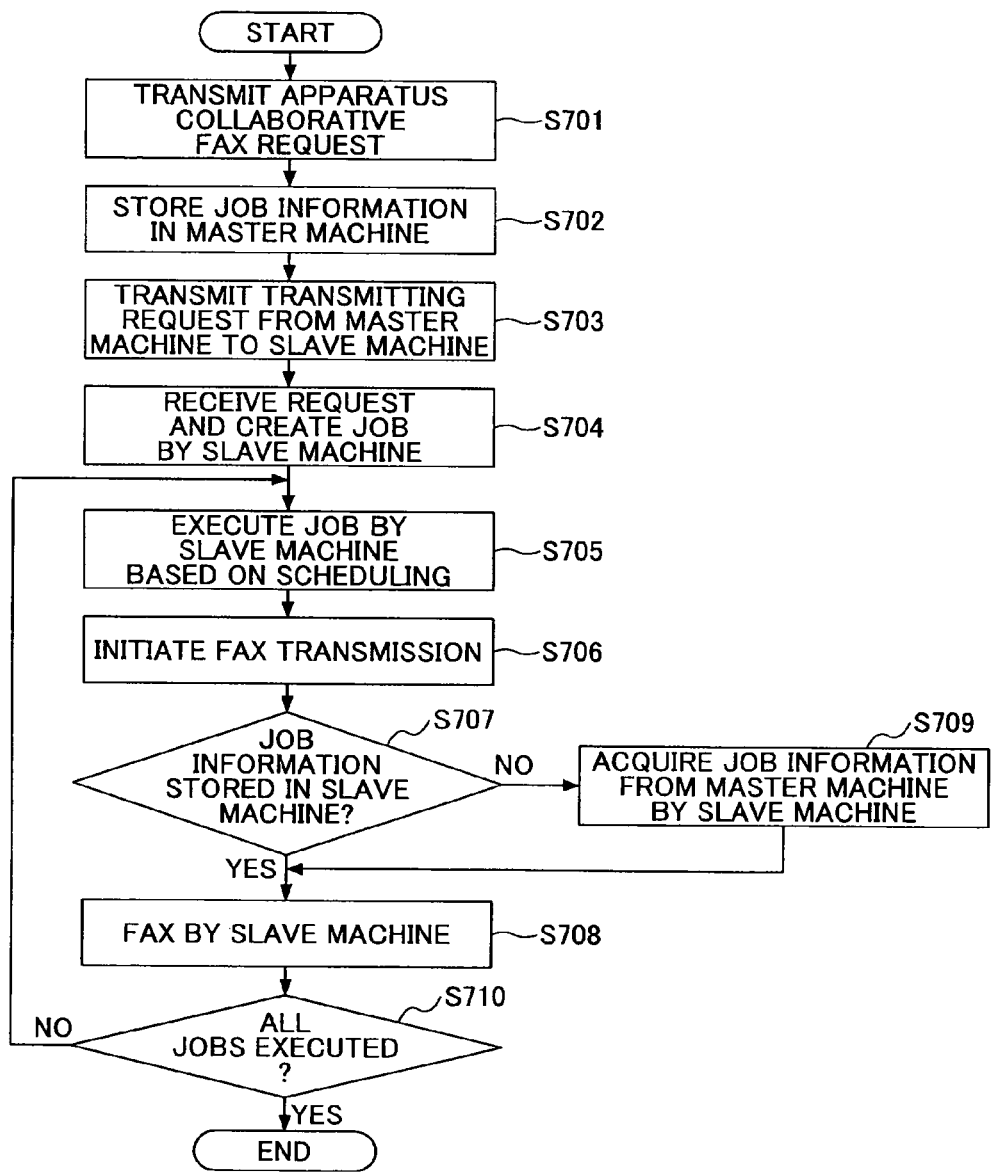
FIG. 7 is a first flowchart illustrating an operation of the image processing system according to the first embodiment.

Next, operations of the image processing system 100 according to the first embodiment are described. FIG. 7 is a first flowchart illustrating an operation of the image processing system 100 according to the first embodiment. Note that the master machine corresponds to the image processing apparatus 110 and the slave machine corresponds to the image processing apparatus 130 in the following description.

In the image processing system 100 according to the first embodiment, when a user of the image processing apparatus 110 receives an apparatus collaborative FAX request (step S701), the image processing apparatus 110 stores job information 60 corresponding to the received request (step S702). Subsequently, the image processing apparatus 110 transmits a transmitting request that transmits the slave machine transmitting information 70 to the image processing apparatus 130 (step S703).

The job receiver 330 of the image processing apparatus 130 receives the transmitting request including the slave machine transmitting information 70 transmitted from the image processing apparatus 110 as a job request (step S704). Subsequently, the scheduling controller 334 of the image processing apparatus 130 executes a job based on the scheduling information contained in the slave machine transmitting information 70 (step S705).

When the job is executed, the FAX transmitter 331 of the image processing apparatus 130 initiates FAX transmission of an image (step S706). The job information acquisition determining section 332 of the image processing apparatus 130 determines whether the job information 60 is stored in the image processing apparatus 130 (step S707).

If the job information 60 is stored in the image processing apparatus 130 (Yes in step S707), the image processing apparatus 130 faxes the image (step S708). If, on the other hand, the job information 60 is not stored in the image processing apparatus 130 (No in step S707), the job information acquiring section 333 of the image processing apparatus 130 acquires the job information from the image processing apparatus 110, and the process to be carried out moves to step S708 (step S709). Note that the job information acquiring section 333 acquires the job information identifier, the job identifier, and the job information 60 corresponding to the job identifier in step S709.

When the image processing apparatus 130 completes faxing in step S708, the image processing apparatus 130 determines whether all of the jobs have been executed (step S710). If all of the jobs is completed (Yes in step S710), the image processing apparatus 130 ends the process. If, on the other hand, the execution of all the job information is not completed (No in step S710), the image processing apparatus 130 repeats the subsequent processes from step S705.

As described above, when the job is executed based on the collaborative apparatus, the image processing apparatus 130 that serves as the slave machine stores the scheduling information such that the image processing apparatus 130 serving as a corporative machine may be able to fax the image based on the round-robin scheduling in the image processing system 100 according to the first embodiment.

Figure 8:
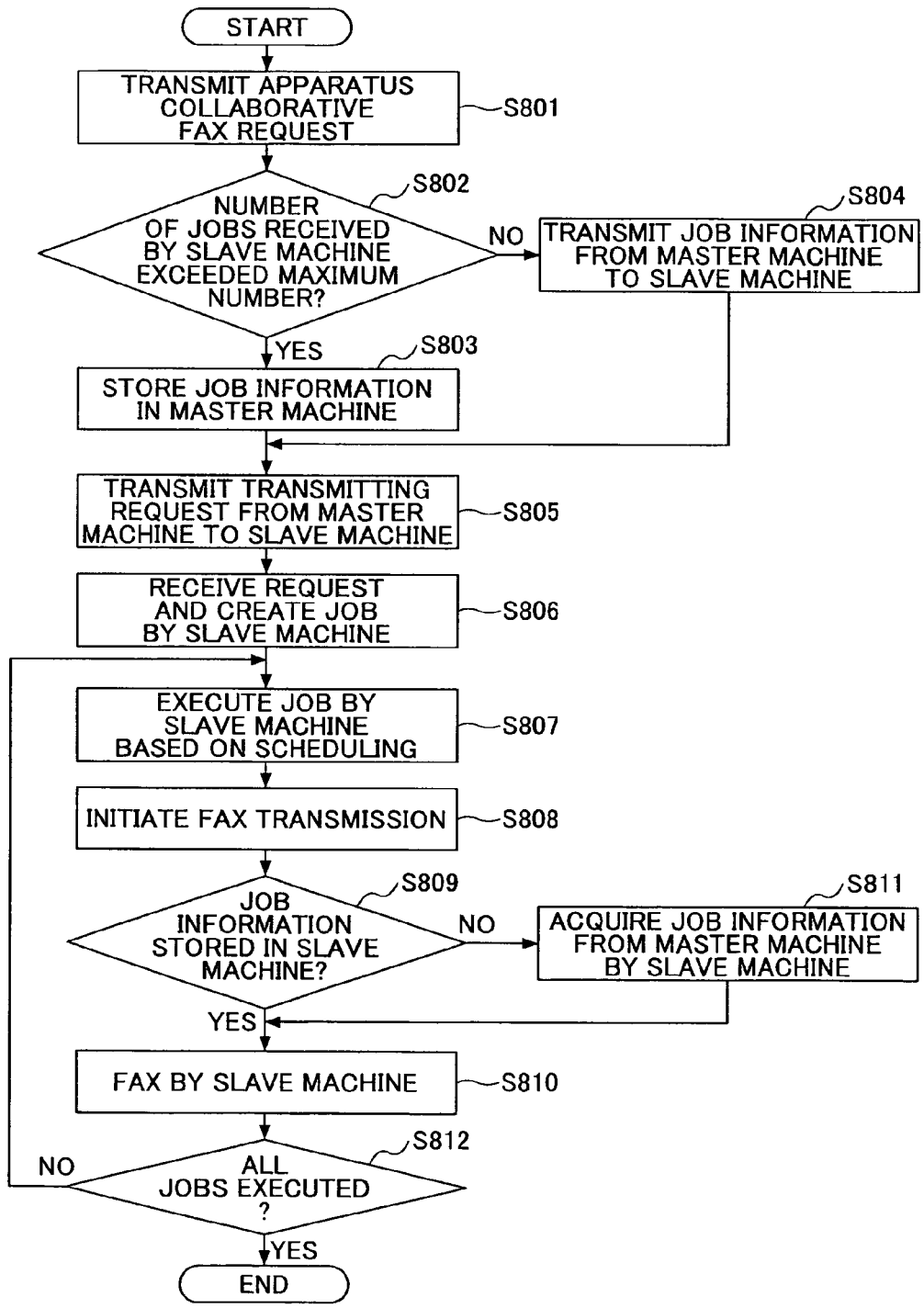
FIG. 8 is a second flowchart illustrating an operation of the image processing system according to the first embodiment.

Further, in the image processing system 100 according to the first embodiment, the image processing apparatuses may be collaborative based on the number of jobs received by the slave machine. FIG. 8 is a second flowchart illustrating an operation of the image processing system 100 according to the first embodiment.

In the image processing system 100 according to the first embodiment, when a user of the image processing apparatus 110 receives an apparatus collaborative FAX request (step S801), the image processing apparatus 110 determines whether the number of jobs received by the image processing apparatus 130 serving as the slave machine exceeds the maximum allowable number of jobs to be received by the image processing apparatus 130 (step 802).

If the number of jobs received by the image processing apparatus 130 exceeds the maximum allowable number of jobs (Yes in step S802), the image processing apparatus 110 stores the job information 60 (step S803). If the number of jobs received by the image processing apparatus 130 has not exceeded the maximum allowable number of jobs (No in step S802), the image processing apparatus 110 transmits the job information 60 to the image processing apparatus 130 (step S804).

Note that the processes in steps S805 through S812 in FIG. 8 are similar to those in steps S703 through S710 in FIG. 7, and the corresponding descriptions in FIG. 8 are thus omitted.

Accordingly, the master machine transmits the job information 60 to the slave machine such that the slave machine constantly stores the job information 60 until the capacity of the slave machine to store the job information 60 reaches its upper limit. If the capacity of the slave machine to store the job information 60 has already reached its upper limit, the master machine stores the job information 60. With such a configuration, even if the number of jobs stored in the slave machine exceeds its upper limit capacity, further jobs to be executed may be introduced in the image processing system 100 according to the first embodiment.

Note that in the image processing system 100 according to the first embodiment, the image processing apparatus 110 is illustrated as the master machine; however, the image processing apparatus 120 may also serve as the master machine in place of the image processing apparatus 110.

Second Embodiment

An image processing system 100 according to a second embodiment is described with reference to accompanying drawings. In the image processing system 100 according to the second embodiment, if the number of jobs has not exceeded the maximum allowable number in the slave machine, the slave machine acquires corresponding sets of the job information 60 from the master machine in job-introduced order. Note that in the image processing system 100 according to the second embodiment, only components or processes differing from those of the first embodiment are described. The components or the processes similar to those of the first embodiment are denoted by the same reference numerals and their descriptions are omitted.

Figure 9:
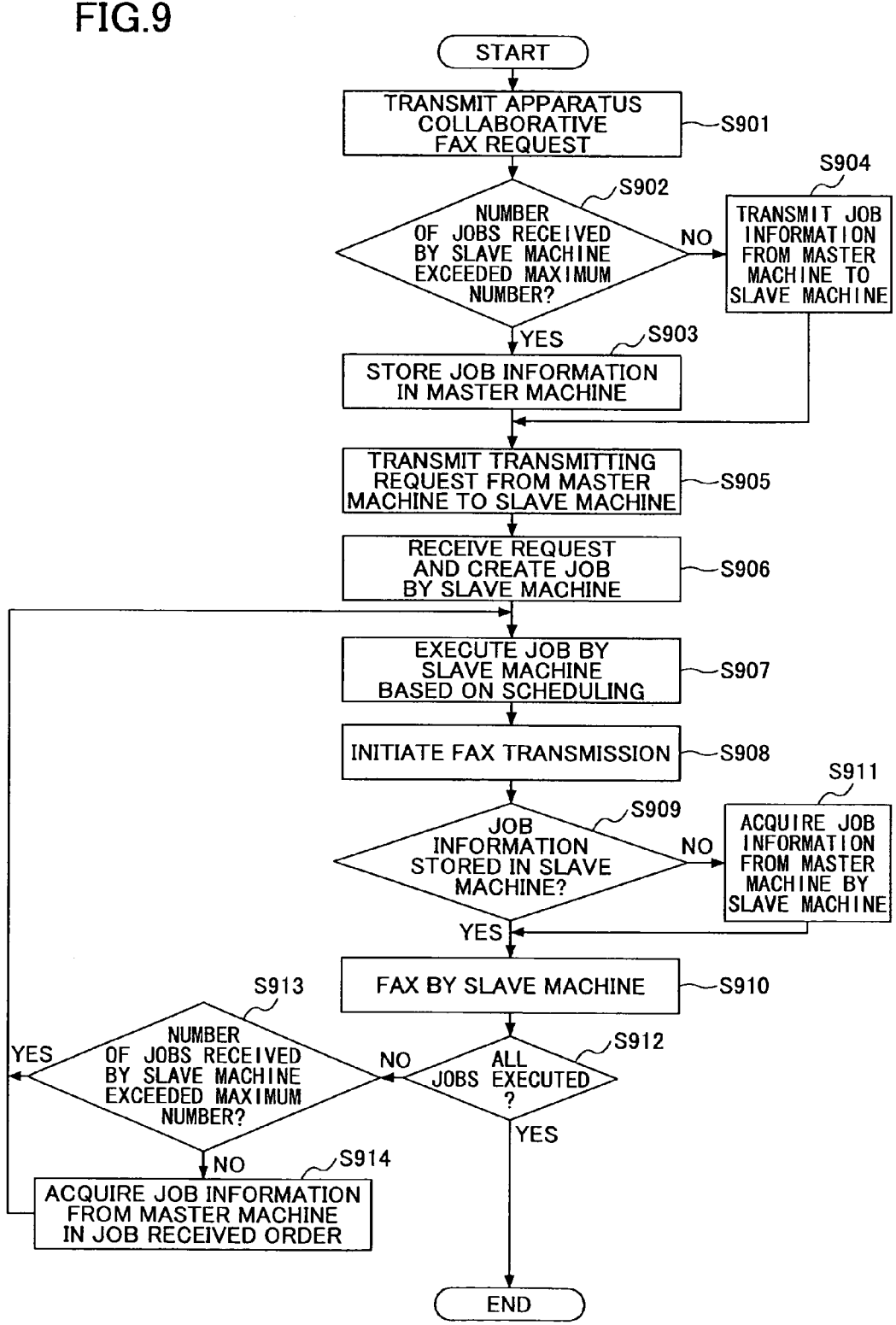
FIG. 9 is a first flowchart illustrating an operation of an image processing system according to a second embodiment.

FIG. 9 is a first flowchart illustrating an operation of the image processing system 100 according to the second embodiment. As illustrated in FIG. 9, the slave machine acquires the sets of the job information in the order of jobs received earlier (i.e., job received order) by the master machine until the number of jobs received by the slave machine exceeds its maximum allowable number.

Note that the processes in steps 901 through S812 in FIG. 9 are similar to those in steps S801 through S812 in FIG. 8, and the corresponding descriptions in FIG. 9 are thus omitted.

If execution of all the jobs is not completed (No in step S912) the image processing apparatus 130 determines whether the number of jobs received by the image processing apparatus 130 exceeds the maximum allowable number of jobs (S913). If the number of jobs received by the image processing apparatus 130 exceeds the maximum allowable number of jobs (Yes in step S913), the process to be carried out moves back to step S907.

If, on the other hand, the number of jobs received by the image processing apparatus 130 has not exceeded the maximum allowable number of jobs (No in step S913), the job information acquiring section 333 of the image processing apparatus 130 acquires the sets of the job information in the order of jobs received earlier in the image processing apparatus 110 (step S914), and the process to be carried out moves back to step S907.

Figure 10:
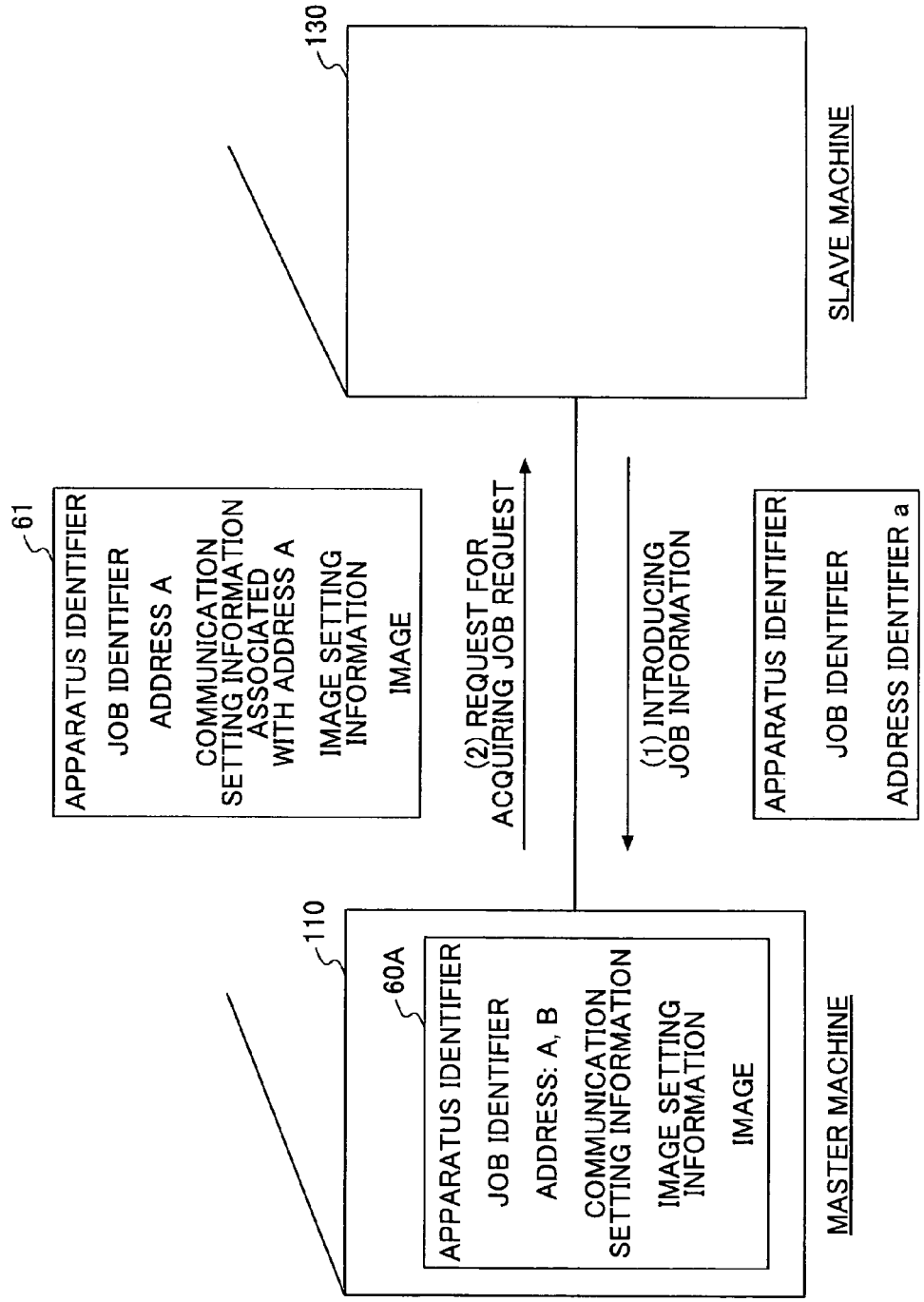
FIG. 10 is a first diagram illustrating a process of acquiring job information in the image processing system according to the second embodiment.

Next, a process of acquiring job information 60A in the image processing system 100 according to the second embodiment is described with reference to FIG. 10. FIG. 10 is a first diagram illustrating the process of acquiring job information 60A in the image processing system 100 according to the second embodiment.

The job information 60A to be introduced from the image processing apparatus 110 (master machine) to the image processing apparatus 130 (slave machine) is described with reference to FIG. 10. The image processing apparatus 110 stores the job information 60A including plural units of address information. The image processing apparatus 130 in the image processing system 100 according to the second embodiment transmits a request for acquiring the job information 60A to the image processing apparatus 110. The information transmitted with the request for acquiring the job information 60A to the image processing apparatus 110 includes the job information identifier corresponding to the apparatus identifier, the job identifier, and an address identifier to which the image is faxed.

On receiving the request for acquiring the job information 60A, the image processing apparatus 110 generates job information 61 corresponding to the request for acquiring the job information 60A and transmits the generated job information 61 to the image processing apparatus 130. The job information 61 includes an apparatus identifier, a job identifier, address information corresponding to an address identifier transmitted from the slave machine (i.e., image processing apparatus 130), communication setting information associated with the address information, image setting information and an image to be faxed. The image processing apparatus 130 executes fax transmission based on the job information 61.

In the image processing system 100 according to the second embodiment, the slave machine may preferably store as much job information as possible, and when the slave machine acquires space to store more jobs, the jobs are sequentially introduced from the master machine to the slave machine. With this configuration, the number of communications between the collaborative apparatuses may be reduced.

Thus, in the image processing system 100 according to the second embodiment, the load on the communication line connected between the master machine and the slave machine may be reduced. Further, with this configuration, an adverse effect due to a status of the master machine or a communication status between the master machine and slave machine may be reduced, which may enable FAX transmission in stable apparatus collaboration.

Further, in the image processing system 100 according to the second embodiment, if the number of jobs has not exceeded the maximum allowable number in the slave machine, the slave machine may acquire the additional sets of job information 60A from the master machine in the order of image data size from the largest size to the smallest size.

Figure 11:
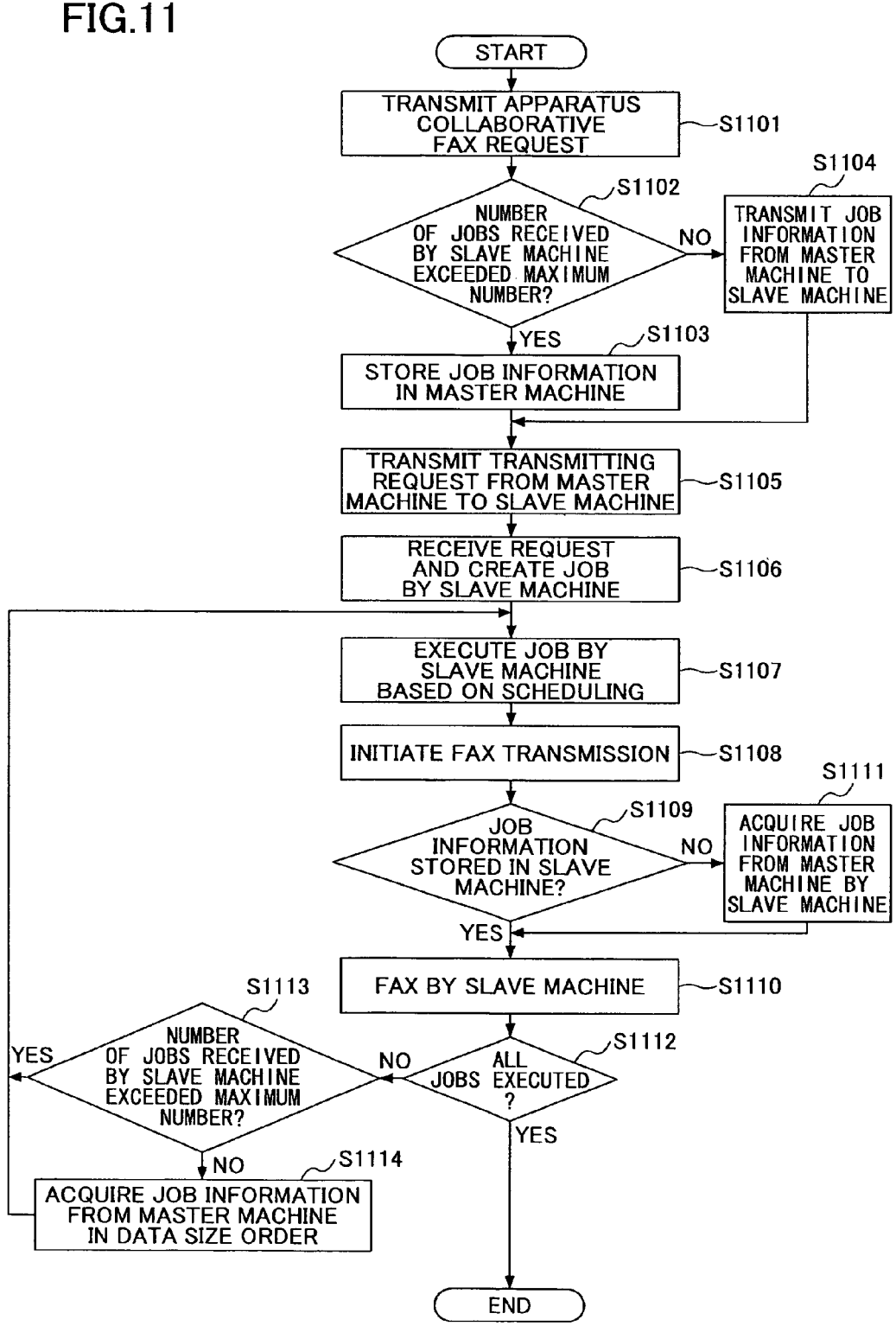
FIG. 11 is a second flowchart illustrating an operation of then image processing system according to the second embodiment.

FIG. 11 is a second flowchart illustrating an operation of the image processing system 100 according to the second embodiment. As illustrated in FIG. 11, the slave machine acquires the sets of the job information 60A from the master machine in the order of image data size from the largest size to the smallest size (i.e., image data size order) until the number of jobs received by the slave machine exceeds its maximum allowable number.

Note that the processes in steps 1101 through S1112 in FIG. 11 are similar to those in steps S901 through S912 in FIG. 9, and the corresponding descriptions in FIG. 11 are thus omitted.

If the number of jobs received by the image processing apparatus 130 has not exceeded the maximum allowable number of jobs (No in step S1113), the job information acquiring section 333 of the image processing apparatus 130 acquires the sets of the job information 60A from the image processing apparatus 110 in the order of image data size from the largest size to the smallest size (step S1114), and the process to be carried out moves back to step S1107.

Figure 12:
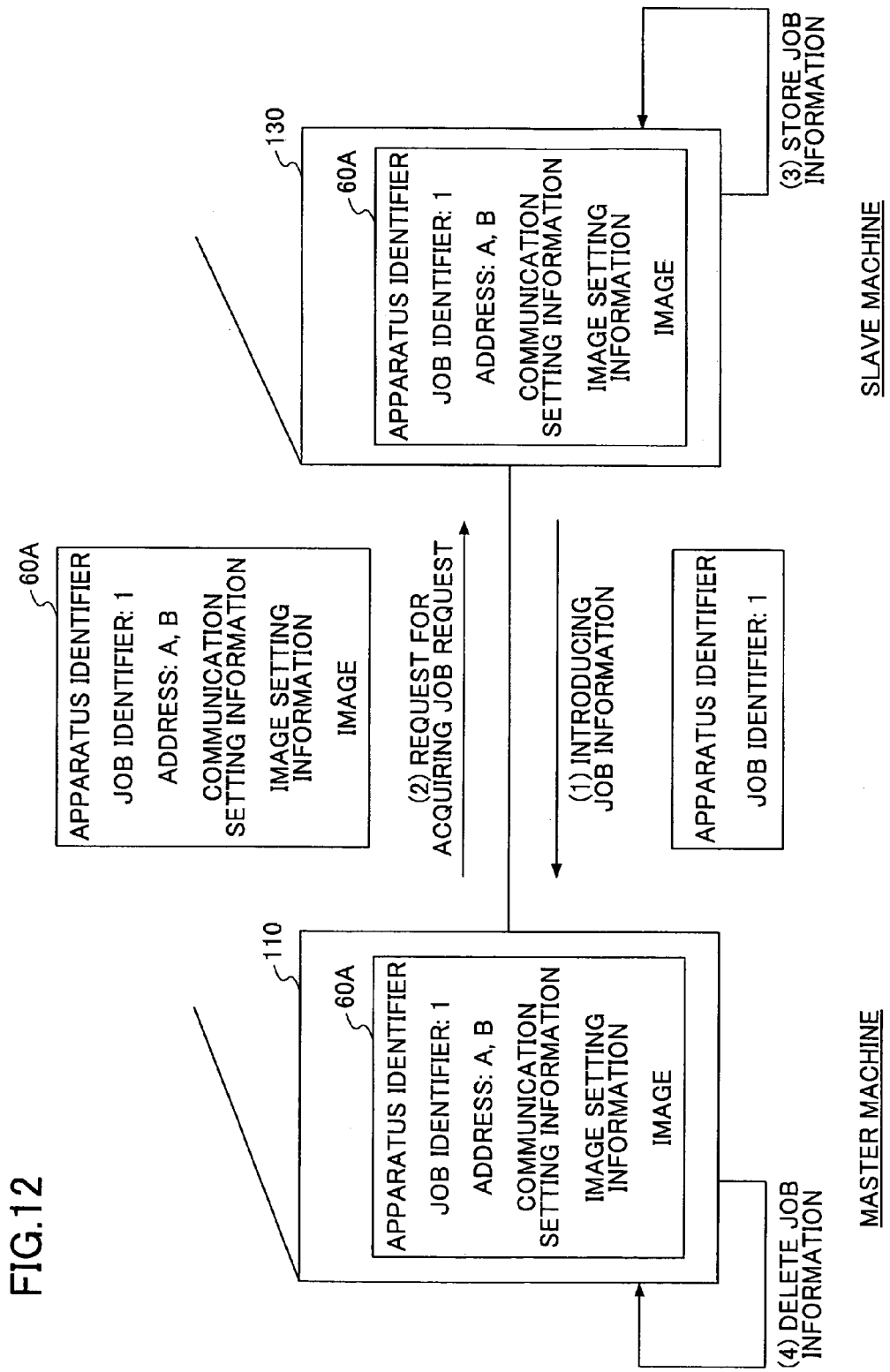
FIG. 12 is a second diagram illustrating the process of acquiring job information in the image processing system according to the second embodiment.

Next, a process of acquiring the job information 60A in the image processing system 100 according to the second embodiment is described with reference to FIG. 12. FIG. 12 is a second diagram illustrating the process of acquiring job information in the image processing system 100 according to the second embodiment.

The image processing apparatus 110 stores the job information 60A. If the image processing apparatus 130 has a space for storing the job information, the image processing apparatus 130 transmit a request for acquiring job information 60A to the image processing apparatus 110. The image processing apparatus transmits the request for acquiring job information 60A with the information including the apparatus identifier and the job identifier. On receiving the request for acquiring the job information 60A, the image processing apparatus 110 directly transmits the job information 60A corresponding to the received request to the image processing apparatus 130. The image processing apparatus 130 then stores the job information 60A acquired from the image processing apparatus 110. On transmitting the job information 60A, the image processing apparatus 110 deletes the job information 60A.

In the image processing system 100 according to the second embodiment, since the sets of the job information 60A are introduced from master machine to slave machine in the order of image data size from the largest size to the smallest size, data communication between the collaborative apparatus may be reduced. Thus, with this configuration, the load on the communication line connected between the master machine and the slave machine may be reduced. Further, with this configuration, an adverse effect due to a status of the master machine or a communication status between the master machine and slave machine may be reduced, which may enable FAX transmission in stable apparatus collaboration.

Further, in the image processing system 100 according to the second embodiment, if the number of jobs has not exceeded the maximum allowable number in the slave machine, the slave machine may acquire the sets of the job information 60A from the master machine in the order of the number of addresses to which the image data are faxed from the largest number to the smallest number.

Figure 13:
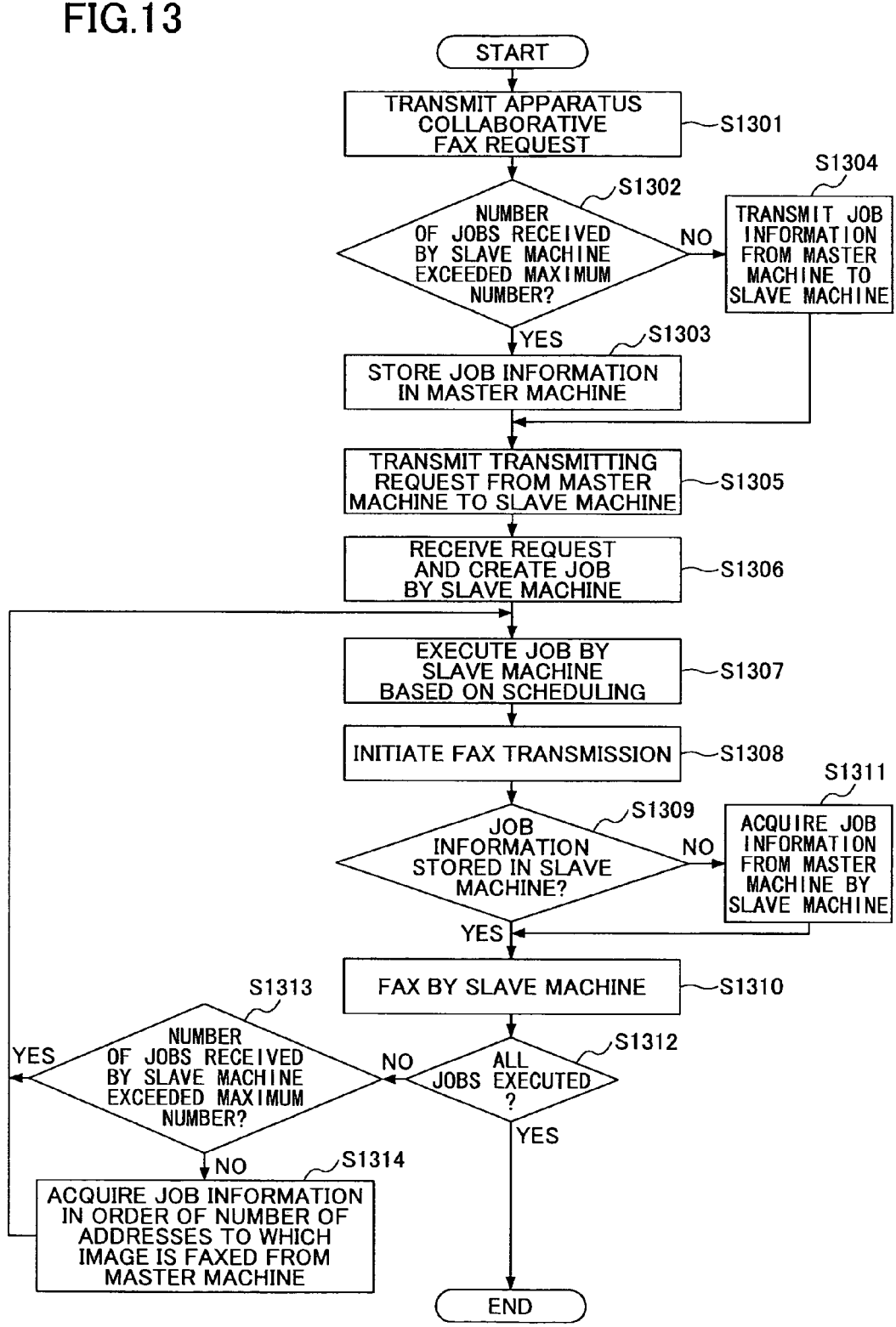
FIG. 13 is a third flowchart illustrating an operation of the image processing system according to the second embodiment.

FIG. 13 is a third flowchart illustrating an operation of the image processing system 100 according to the second embodiment. As illustrated in FIG. 13, the slave machine acquires the sets of the job information 60A from the master machine in the order of the number of addresses to which the image data are faxed from the largest number to the smallest number until the number of jobs received by the slave machine exceeds its maximum allowable number.

Note that the processes in steps 1301 through S1313 in FIG. 13 are similar to those in steps S901 through S913 in FIG. 9, and the corresponding descriptions in FIG. 13 are thus omitted.

If the number of jobs received by the image processing apparatus 130 has not exceeded the maximum allowable number of jobs (No in step S1313), the job information acquiring section 333 of the image processing apparatus 130 acquires the sets of the job information 60A from the image processing apparatus 110 in the order of the number of addresses to which the image data are faxed from the largest number to the smallest number (step S1314), and the process to be carried out moves back to step S1307.

In the image processing system 100 according to the second embodiment, since the sets of the job information 60A are introduced from master machine to the slave machine in the descending order of the number of addresses to which the image data are faxed, data communication between the collaborative apparatus may be reduced. Thus, with this configuration, the load on the communication line connected between the master machine and the slave machine may be reduced. Further, with this configuration, an adverse effect due to a status of the master machine or a communication status between the master machine and slave machine may be reduced, which may enable FAX transmission in stable apparatus collaboration.

Further, in the image processing system 100 according to the second embodiment, if the number of jobs has not exceeded the maximum allowable number in the slave machine, the slave machine may acquire the sets of the job information 60A from the master machine in a descending order of multiplied values obtained by multiplying the number of addresses by image data size.

Figure 14:
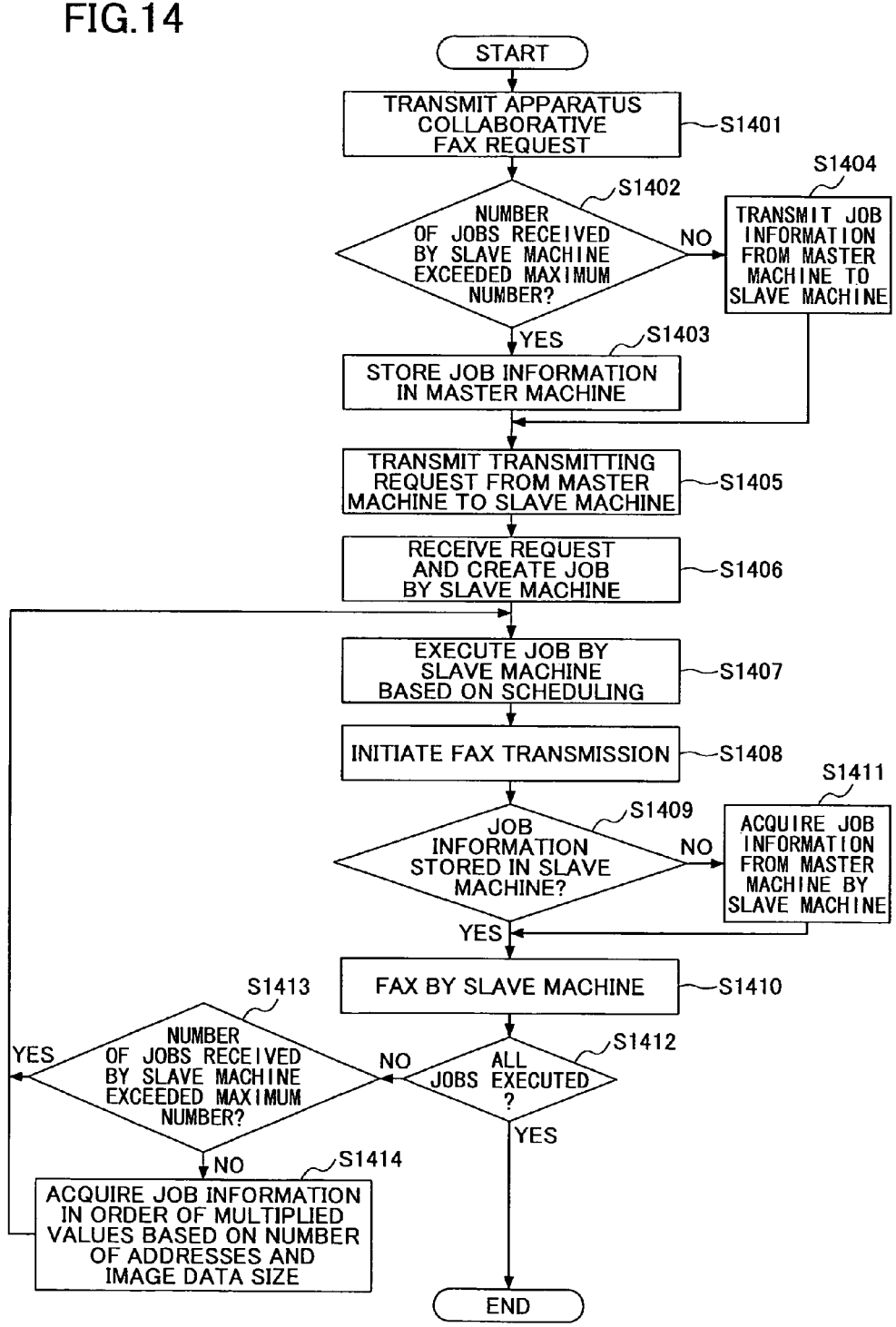
FIG. 14 is a fourth flowchart illustrating an operation of the image processing system according to the second embodiment.

FIG. 14 is a fourth flowchart illustrating an operation of the image processing system 100 according to the second embodiment. As illustrated in FIG. 14, the slave machine acquires the sets of the job information 60A from the master machine in a descending order of multiplied values obtained by multiplying the number of addresses by image data size until the number of jobs received by the slave machine exceeds its maximum allowable number.

Note that the processes in steps 1401 through S1413 in FIG. 14 are similar to those in steps S901 through S913 in FIG. 9, and the corresponding descriptions in FIG. 14 are thus omitted.

If the number of jobs received by the image processing apparatus 130 has not exceeded the maximum allowable number of jobs (No in step S1413), the job information acquiring section 333 of the image processing apparatus 130 acquires the sets of the job information 60A from the image processing apparatus 110 in the descending order of multiplied values obtained by multiplying the number of addresses by image data size (step S1414), and the process to be carried out moves back to step S1407.

In the image processing system 100 according to the second embodiment, since the sets of the job information 60A are introduced from master machine to slave machine in the descending order of image data size from the largest size to the smallest size and the order of the number of addresses to which the image data are faxed from the largest number to the smallest number, the load on the communication line between the master machine and the slave machine may be reduced.

Third Embodiment

An image processing system 100 according to a third embodiment is described with reference to accompanying drawings. The image processing system 100 according to the third embodiment illustrates a case where acquisition of the job information is interrupted. Note that in the image processing system 100 according to the third embodiment, only components or processes differing from those of the first embodiment are described. The components or the processes similar to those of the first embodiment are denoted by the same reference numerals and their descriptions are omitted.

Figure 15:
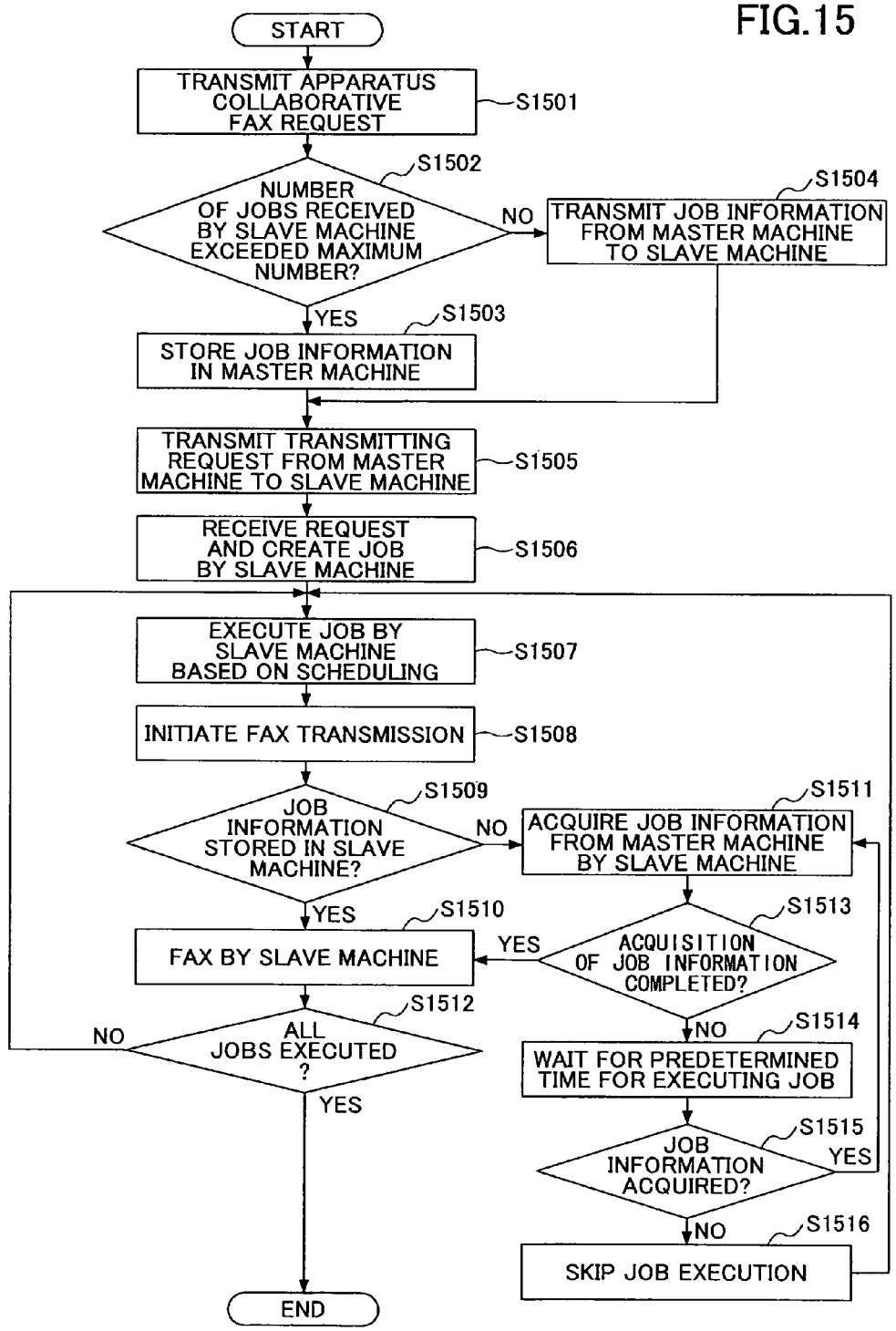
FIG. 15 is a first flowchart illustrating an operation of an image processing system according to a third embodiment.

FIG. 15 is a first flowchart illustrating an operation of the image processing system 100 according to the third embodiment.

FIG. 15 illustrates a case where the slave machine is interrupted from normally acquiring the job information due to occurrence of an abnormal operation while the slave machine is temporarily acquiring the job information from the master machine.

Note that the processes in steps 1501 through S1112 in FIG. 15 are similar to those in steps S901 through S912 in FIG. 9, and the corresponding descriptions in FIG. 15 are thus omitted.

When the image processing apparatus 130 serving as the slave machine acquires the job information 60A, the image processing apparatus 130 determines whether acquisition of the job information 60A is completed (S1513). If the acquisition of the job information 60A is completed (Yes in step S1513), the process to be carried out moves back to step S1510.

If, on the other hand, the acquisition of the job information 60A is not completed (No in step S1513), the image processing apparatus 130 waits for a predetermined time for executing a job (step S1514). Note that the predetermined waiting time may be set to the image processing apparatus 130 in advance.

Subsequently, the image processing apparatus 110 serving as the master machine determines in a second attempt whether it is possible for the image processing apparatus 130 to acquire the job information 60A (step S1515). If it is possible for the image processing apparatus 130 to acquire the job information 60A in a second attempt (Yes in step S1515), the image processing apparatus 110 transmits a report indicating that the image processing apparatus 130 may acquire the job information 60A to the image processing apparatus 130, and the process to be carried out moves back to step S1511. If, on the other hand, it is not possible for the image processing apparatus 130 to acquire the job information 60A in a second attempt (No in step S1515), the image processing apparatus 130 skips the job execution corresponding to the job information 60A (step S1516), and the process to be carried out moves back to step S1507.

Figure 16:
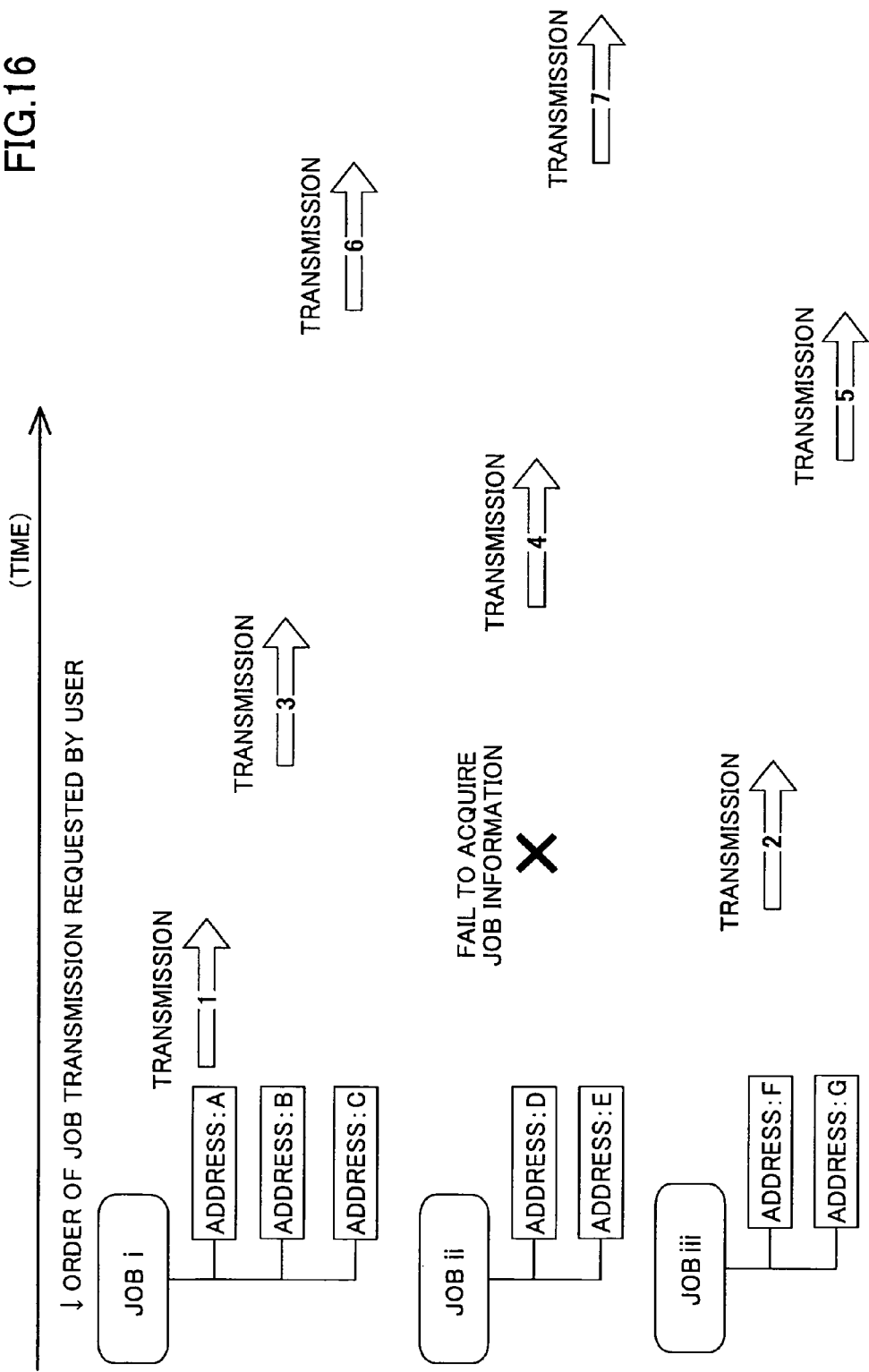
FIG. 16 is a diagram illustrating an example of a transmitting order in the scheduling when the execution of a job is skipped.

FIG. 16 is a diagram illustrating an example of a transmitting order in the scheduling when an execution of a job is skipped. When there are jobs to be executed as illustrated in FIG. 16, a transmission request is normally transmitted in the order of address A, D, F, B, E, G, and C in the round-robin scheduling. However, if the image processing apparatus 130 fails to acquire the job information 60A when a job request is transmitted to the address D, the execution of the job corresponding to the job request transmitted to the address D is skipped. As a result, the job requests are transmitted to the addresses in the order of address A, F, B, D, G, C, and E.

As described above, in the image processing system 100 according to the third embodiment, if the slave machine fails to acquire the job information 60A due to abnormal operation having occurred while the job information 60A is temporarily introduced to the slave machine, the slave machine waits for the predetermined time until the job information is readily introduced to the slave machine in a second attempt. If the slave machine fails to acquire the job information 60A, the slave machine skips the job corresponding to the job information 60A the slave machine has-failed to acquire and initiates execution of a subsequent job. Thus, in the image processing system 100 according to the third embodiment, even if the slave machine has failed to acquire the job information 60A due to occurrence of an abnormal operation while the slave machine is temporarily acquiring the job information 60A, the slave machine may execute the jobs based on the scheduling with minimum deviation.

Figure 17:
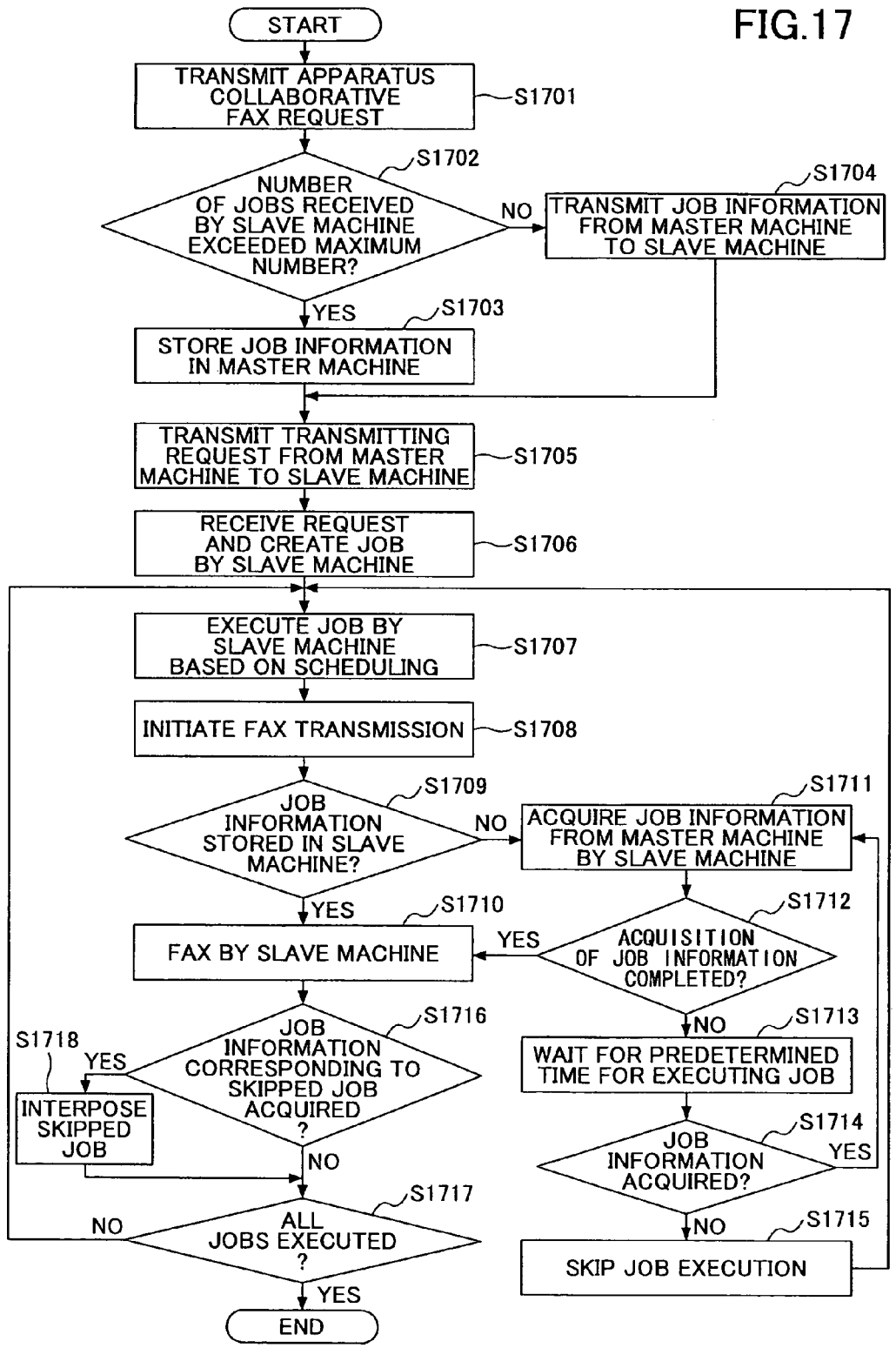
FIG. 17 is a second flowchart illustrating an operation of the image processing system according to the third embodiment.

FIG. 17 is a second flowchart illustrating an operation of the image processing system 100 according to the third embodiment.

In the case of FIG. 17, when the slave machine fails to normally acquire the job information due to occurrence of an abnormal operation while the slave machine is temporarily acquiring the job information from the master machine, the slave machine waits for the predetermined time. If the slave machine receives no report on the reintroduction of the job information from the master machine within the predetermined time, the slave machine skips the execution of the target job corresponding to the job information the slave machine has failed to acquire. The slave machine interposes the skipped job in the scheduling when the slave machine may acquire the job information corresponding to the skipped job.

Note that the processes in steps 1701 through S1710 in FIG. 17 are similar to those in steps S1501 through S1510 in FIG. 15, and the corresponding descriptions in FIG. 17 are thus omitted.

If the job information 60A is not stored in the image processing apparatus 130 (No in step S1709), the process to be carried out moves to step S1711. Note that the processes in steps S1711 through S1715 in FIG. 17 are similar to those in steps S1513 through S1516 in FIG. 15, and the descriptions corresponding to the processes in steps S1711 through S1715 are thus omitted.

When the image processing apparatus 130 serving as the slave machine executes the FAX transmission, the image processing apparatus serving as the master machine determines whether it is possible for the image processing apparatus 130 to acquire the job information 60A again (step S1716). If it is not possible for the image processing apparatus 130 to acquire the job information 60A (No in step S1716), the image processing apparatus 130 ends the process. If, on the other hand, it is possible for the image processing apparatus 130 to acquire the job information 60A (yes in step S1716), the image processing apparatus 110 transmits to the image processing apparatus 130 a report indicating that it is possible for the image processing apparatus 130 to acquire the job information 60A. On receiving the report from the image processing apparatus 110, the image processing apparatus 130 acquires the job information 60A and interposes the skipped job (step S1718), and the process to be carried out moves to step S1717. Note that in the image processing system 100 according to the third embodiment, if the image processing apparatus 130 acquires the job information 60A that the image processing apparatus 130 has once failed to acquire after skipping the job corresponding to the job information 60A, the image processing apparatus 130 interposes the skipped job subsequent to the currently executed job.

FIG. 18 is a diagram illustrating an example of a transmitting order in the scheduling when the skipped job is interposed.

FIG. 18 illustrates a case where the slave machine fails to acquire the job information while transmitting the job request to the first address D, and has once skipped the job execution corresponding to the job information the slave machine has failed to acquire; however, the slave machine later becomes capable of acquiring the job information corresponding to the skipped job while transmitting the job request to the second address F. In this case, the slave machine is not transmitting the job request to the address B but interposes the transmission of the job request corresponding to the skipped job after the transmission of the job request to the address F is completed.

In the image processing system 100 according to the third embodiment, even if the slave machine has failed to acquire the job information due to an abnormal operation having occurred while the job information is temporarily introduced to the slave machine, the slave machine waits for the predetermined time and interposes the job request corresponding to the skipped job when the job information is readily introduced to the slave machine in a second attempt. Thus, in the image processing system 100 according to the third embodiment, even if the slave machine has failed to normally acquire the job information due to abnormal operation having occurred while the job information is temporarily introduced to the slave machine, and skipped the job execution corresponding to the job information the slave machine has failed to acquire, the slave machine interposes the job request corresponding to the skipped job when the job information is readily introduced to the slave machine in a subsequent attempt.

In the image processing system according to the embodiments described above, even if the job information is stored in the plural collaborative apparatuses, FAX transmission may be implemented in the round-robin scheduling.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Application No. 2010-127295 filed on Jun. 2, 2010, with the Japanese Patent Office, the entire contents of which are hereby incorporated by reference.

What is claimed is:

1. An image processing system comprising:
a first image processing apparatus; and
a second image processing apparatus connected to the first image processing apparatus, wherein
the first image processing apparatus includes,
a reader configured to read an image of a document as image data;
a storage configured to store job information including the image data, an address to which the image data are to be transmitted and a transmission condition of the image data;
a request unit configured to transmit a job request as a job to the second image processing apparatus together with identifier information for specifying the job information and control information for controlling job execution scheduling based on which the job corresponding to the job information is executed such that the request unit requests the second image processing apparatus to execute the job corresponding to the job information based on the job execution scheduling;
an introducing unit configured to introduce the job information to the second image processing apparatus; and a detector configured to detect whether a number of the jobs reaches an upper limit of a number of jobs received by the second image processing apparatus, and wherein the second image processing apparatus includes,
- a receiver configured to receive the job request transmitted from the first image processing apparatus as the job;
- a job executing unit configured to execute the job, corresponding to the job information, requested by the first image processing apparatus;
- a determining unit configured to determine whether to acquire the job information based on the job execution scheduling; and
- an acquiring unit configured to acquire the job information from the first image processing apparatus based on a determined result supplied by the determining unit, and wherein the second image processing apparatus manages the number of the jobs received from the first image processing apparatus, when the detector has detected that the number of the jobs received by the second image processing apparatus has reached the upper limit thereof, the storage stores the job information corresponding to the job, and the introducing unit introduces to the second image processing apparatus the job information corresponding to the address to which the image data are to be transmitted from the second image processing apparatus, when the number of the jobs received by the second image processing apparatus has not reached the upper limit thereof, the second image processing apparatus causes the acquiring unit to acquire corresponding sets of the job information from the first image processing apparatus in an order of a number of addresses contained the job information from a largest number to a smallest number.

2. The image processing system as claimed in claim 1, wherein when the number of the jobs received by the second image processing apparatus has not reached the upper limit thereof, the order that the acquiring unit acquires the corresponding sets of the job information is such that the first image processing apparatus has stored the job information corresponding to the jobs.

3. The image processing system as claimed in claim 1, wherein the first image processing apparatus further includes:
a calculator configured to calculate a size of the image data, and when the number of the jobs received by the second image processing apparatus has not reached the upper limit thereof, the order that the acquiring unit acquires the corresponding sets of the job information is also in order of the size of the image data from a largest size to a smallest size.

4. An image processing system comprising:
a first image processing apparatus; and
a second image processing apparatus connected to the first image processing apparatus, wherein the first image processing apparatus includes,
- a reader configured to read an image of a document as image data;
- a storage configured to store job information including the image data, an address to which the image data are to be transmitted and a transmission condition of the image data;
- a request unit configured to transmit a job request as a job to the second image processing apparatus together with identifier information for specifying the job information and control information for controlling job execution scheduling based on which the job corresponding to the job information is executed such that the request unit requests the second image processing apparatus to execute the job corresponding to the job information based on the job execution scheduling;
- an introducing unit configured to introduce the job information to the second image processing apparatus; and
- a detector configured to detect whether a number of the jobs reaches an upper limit of a number of jobs received by the second image processing apparatus, and wherein the second image processing apparatus includes,
- a receiver configured to receive the job request transmitted from the first image processing apparatus as the job;
- a job executing unit configured to execute the job, corresponding to the job information, requested by the first image processing apparatus;
- a determining unit configured to determine whether to acquire the job information based on the job execution scheduling; and
- an acquiring unit configured to acquire the job information from the first image processing apparatus based on a determined result supplied by the determining unit, and wherein the second image processing apparatus manages the number of the jobs received from the first image processing apparatus, when the detector has detected that the number of the lobs received by the second image processing apparatus has reached the upper limit thereof, the storage stores the job information corresponding to the job, and the introducing unit introduces to the second image processing apparatus the job information corresponding to the address to which the image data are to be transmitted from the second image processing apparatus, and wherein the first image processing apparatus further includes a calculator configured to calculate a size of the image data, and when the number of the jobs received by the second image processing apparatus has not reached the upper limit thereof, the second image processing apparatus causes the acquiring unit to acquire corresponding sets of the job information from the first image processing apparatus in a descending order of multiplied values obtained by multiplying the number of addresses by the size of the image data from a largest size to a smallest size.

* * * * *